United States Patent [19]

Brentham

[11] Patent Number: 4,722,525
[45] Date of Patent: Feb. 2, 1988

[54] PHYSICAL FITNESS DIAGNOSTIC TESTING APPARATUS

[76] Inventor: Jerry D. Brentham, 2121 Industrial Park Rd., Belton, Tex. 76513

[21] Appl. No.: 892,482

[22] Filed: Jul. 31, 1986

Related U.S. Application Data

[60] Division of Ser. No. 614,738, May 25, 1984, which is a continuation-in-part of Ser. No. 495,806, May 18, 1983, which is a continuation-in-part of Ser. No. 285,257, Jul. 20, 1981, Pat. No. 4,448,412, which is a division of Ser. No. 12,874, Feb. 16, 1979, Pat. No. 4,291,787.

[51] Int. Cl.$^4$ .............................................. A63B 21/00
[52] U.S. Cl. .................................. 272/130; 272/134; 272/144; 272/145
[58] Field of Search ............... 272/129, 130, 134, 144, 272/145

[56] References Cited

U.S. PATENT DOCUMENTS

| | | | |
|---|---|---|---|
| 3,226,115 | 5/1962 | Underhill . | |
| 3,465,592 | 9/1969 | Perrine . | |
| 4,247,098 | 1/1981 | Brentham | 272/134 |
| 4,353,547 | 10/1982 | Jenkinson . | |
| 4,354,676 | 10/1982 | Ariel . | |
| 4,637,607 | 1/1987 | McArthur | 272/129 |

FOREIGN PATENT DOCUMENTS 61691  9/1969  Australia .
55121 11/1970  Australia .

Primary Examiner—Leo P. Picard
Attorney, Agent, or Firm—Crutsinger & Booth

[57] ABSTRACT

An exercizing device comprising a computer associated with a plurality of actuating arms pivotally mounted on a chair frame, movement of each actuating arm being resisted by a double acting hydraulic cylinder. Position and pressure sensors associated with each of the hydraulic cylinders, and each of the actuating arms deliver signals through the microprocessor of a computer for indicating power or work exerted by the user for moving each actuating arm. A selector valve is connected to each double acting cylinder and is connected to a control valve to permit independent adjustment of the resistance to movement of the piston of a selected cylinder in opposite directions. The cylinders which are not selected on the selector valve are locked to prevent movement of the actuating arm associated therewith.

2 Claims, 25 Drawing Figures

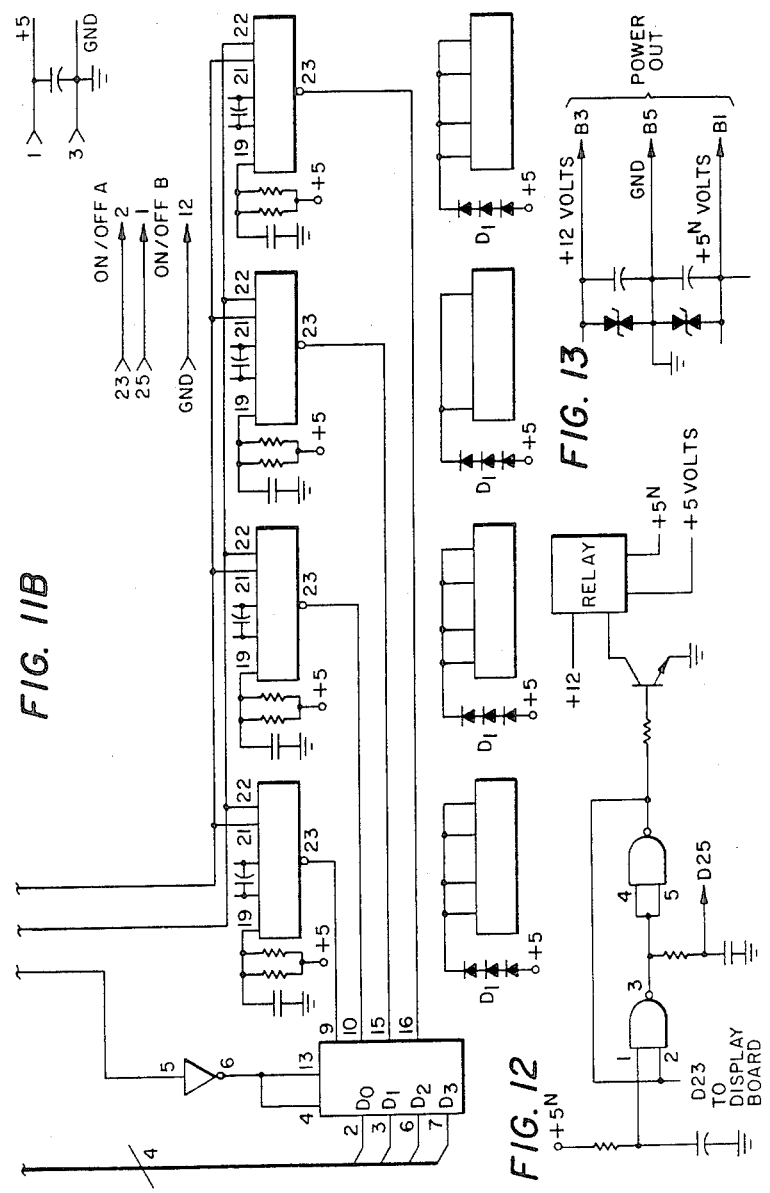

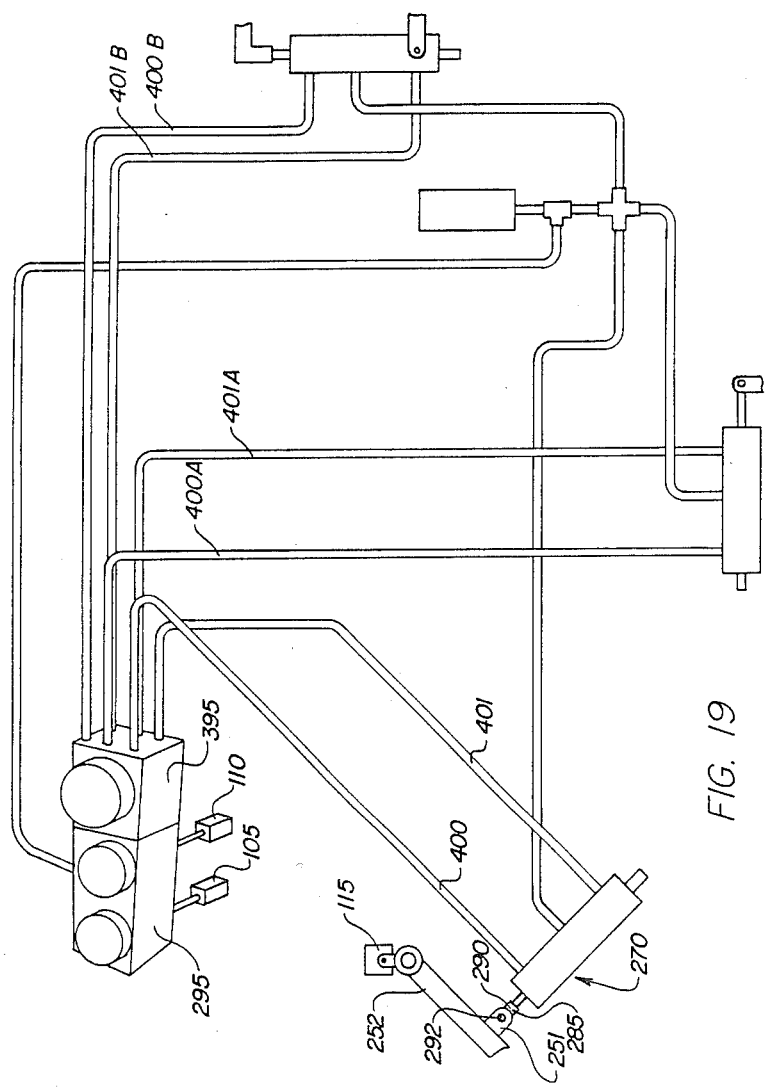

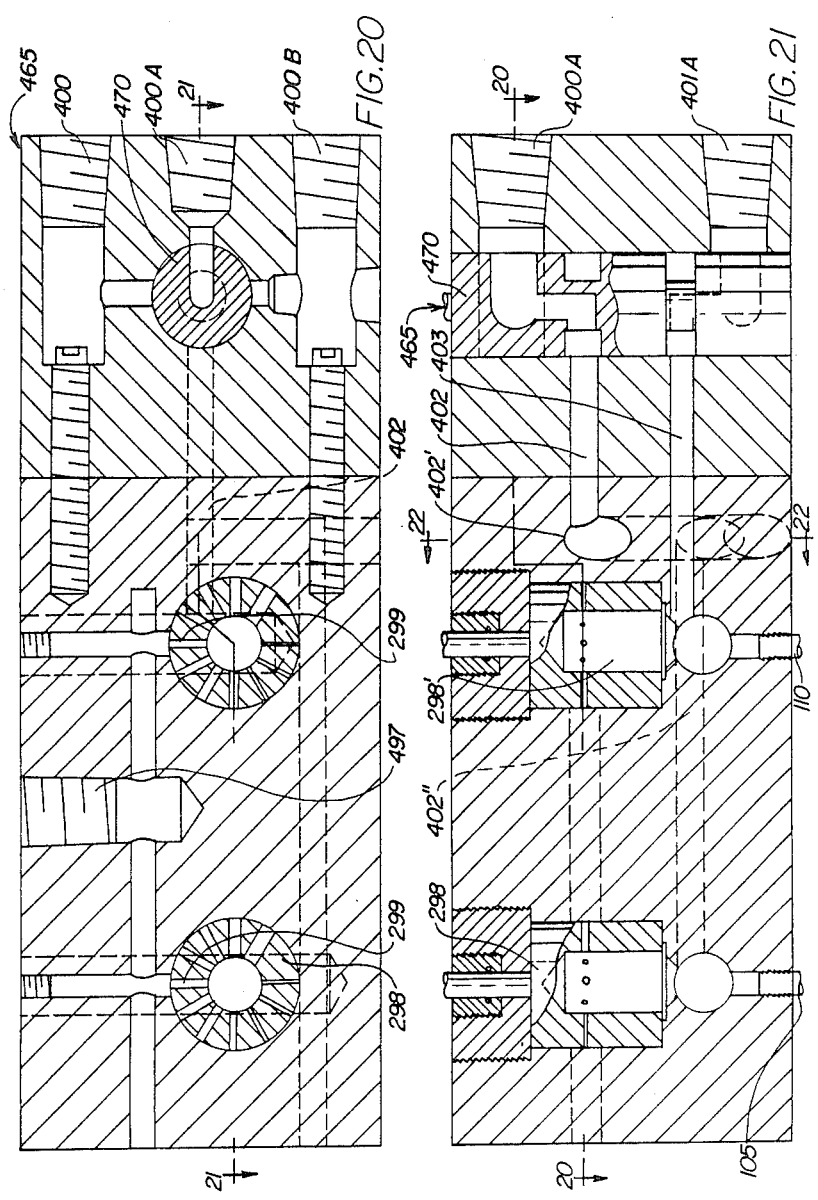

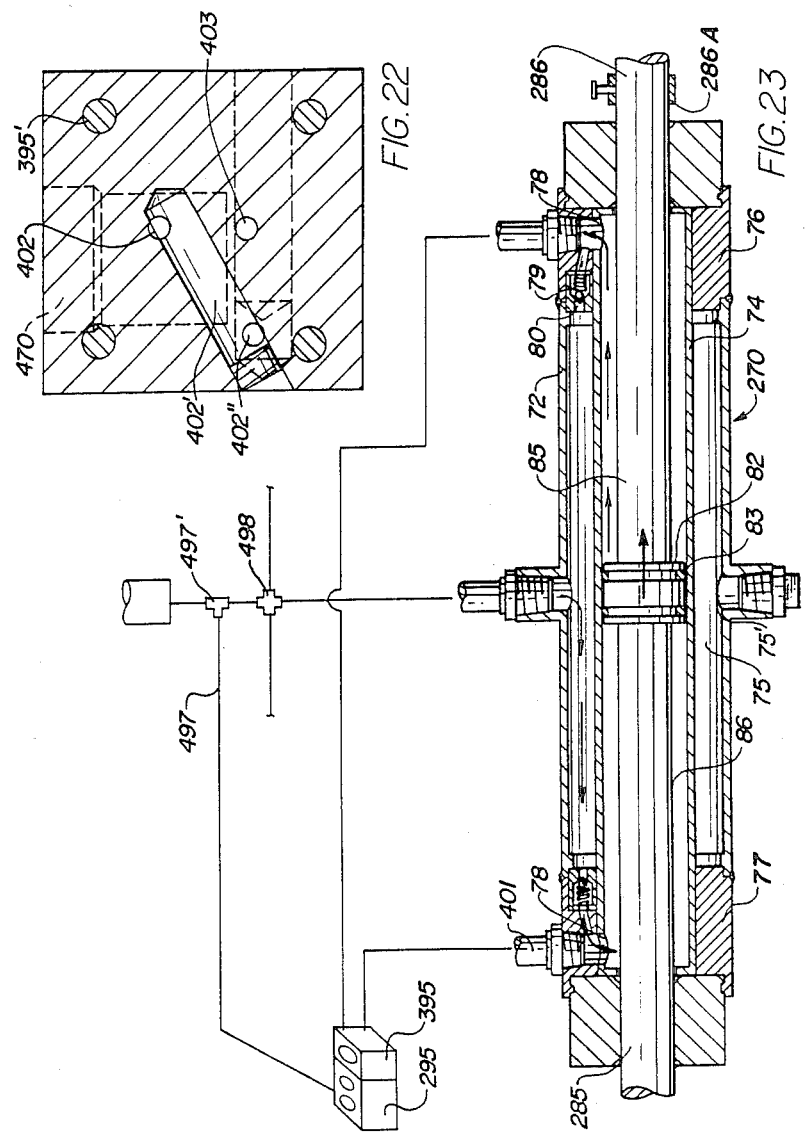

PHYSICAL FITNESS DIAGNOSTIC TESTING APPARATUS

CROSS-REFERENCE TO RELATED APPLICATIONS

This application is a divisional of my co-pending application Ser. No. 06/614,738, filed May 25, 1984, entitled "PHYSICAL FITNESS DIAGNOSTIC APPARATUS"; which was a continuation-in-part of application Ser. No. 06/495,806, filed May 18, 1983, entitled "COMPUTERIZED EXERCISING DEVICE"; which was a continuation-in-part of Ser. No. 285,257, filed July 20, 1981, now U.S. Pat. No. 4,448,412; which was a division of Ser. No. 12,874, filed Feb. 16, 1979, now U.S. Pat. No. 4,291,787.

BACKGROUND OF THE INVENTION

Exercising devices of the type disclosed in U.S. Pat. Nos. 4,291,787, 4,448,412; and U.S. Pat. No. Des. 263,978 are well known to persons skilled in the art and widely used by physical education instructors and physical therapists to strengthen and rehabilitate muscles.

The method and apparatus described in copending application Ser. No. 495,806, filed May 18, 1983, entitled COMPUTERIZED EXERCISING DEVICE disclosed a double seat of chair arrangement for employing a single double acting hydraulic cylinder connected to a leg exercising device and associated pressure and position transducers for indicating force and power at various ranges of movement of a leg. The apparatus disclosed herein incorporates a plurality of double acting hydraulic cylinders connected through a selector valve and control valve to provide a computer readout of force exerted through arms and legs while the user is seated on a chair-like body support member.

Since body movement involves an extremely complex arrangement of muscles attached to parts of the body to provide movement when the muscles shorten, the maximum force exerted by a body member through a full range of movement varies throughout the range of movement of the body member. For building and rehabilitating muscles, it is desirable that force exerted at various times of angles throughout the range of movement of the body member be known to facilitate prescription of therapy or exercises which will be most beneficial. Further, it is desirable that certain exercises be performed but not others for developing and rehabilitating muscles. For example, for rehabilitating certain knee injuries, it is desirable to provide exercise for certain muscles but not others and to limit movement to a prescribed range.

A primary object of the present invention is to provide sensors associated with a lever or arm which is actuated by the user, in combination with apparatus for indicating power or work done at various angles of rotation.

A further object of the invention is to provide an improved double acting hydraulic cylinder together with a control valve to permit independent adjustment of resistance to movement of the piston in each direction or to resist movement of the piston selectively in either direction but not in the other direction.

In accordance with the invention, the exercising device comprises a frame having a lever arm pivotally secured thereto and a double acting hydraulic cylinder connected between the frame and the lever arm to resist movement of the lever arm. A valve associated with the cylinder is provided with valve elements having passages of varying dimensions to permit independent adjustment of the restriction to fluid flowing from opposite ends of the cylinder such that the force required to extend the rod from one end of the cylinder may differ from the force required to retract the rod back into the cylinder. Pressure transducers are arranged to provide a signal related to pressure required to move the piston through the cylinder in opposite directions. A potentiometer is positioned to supply an output signal related to the position of the lever arm as it rotates about a pivot point. Signals from the pressure transducers and from the potentiometer are delivered through signal conditioning circuits, an analog to digital converter circuit to a microprocessor. The microprocessor is adapted to be reset at the beginning of a timed cycle and to indicate the number of repetitions, elapsed time, accumulated work and power; and work, power and peak load for any single previous repetition. The microprocessor is further adapted to indicate the work or power during flexion and extension of right and left body members for purposes of comparison of the strength of the body members. The output from the microprocessor is delivered to the input of a conventional home computer for data processing, graphic illustration and storage of data.

BRIEF DESCRIPTION OF DRAWINGS

Drawings of a preferred embodiment of the invention are annexed hereto so that the invention may be better and more fully understood, in which:

FIGS. 11, 12 and 13 are wiring diagrams of the display board;

FIG. 19 is a diagrammatic view of a selector valve and control valve and a hydraulic circuit connected to each of the double acting cylinders;

FIG. 20 is a cross-sectional view taken along line 20—20 of FIGS. 19 and 21;

FIG. 21 is a cross-sectional view taken along line 21—21 of FIG. 20;

FIG. 22 is a cross-sectional view taken along line 22—22 of FIG. 21;

FIG. 23 is an enlarged partially sectionalized view of a hydraulic cylinder illustrating the hydraulic connections to the selector valve and the control valve.

Numeral references are employed to designate like parts throughout the various figures of the drawing.

DESCRIPTION OF A PREFERRED EMBODIMENT

Figure 1:
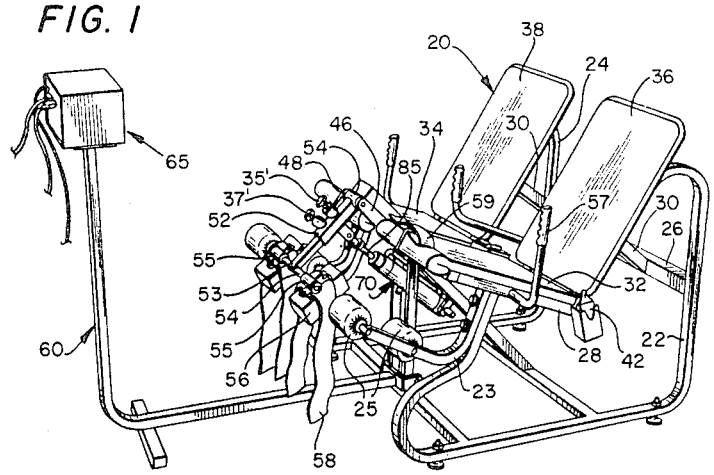
FIG. 1 is a perspective view showing the front and left side of a first embodiment of the exercising device incorporating the invention.
Figure 2:
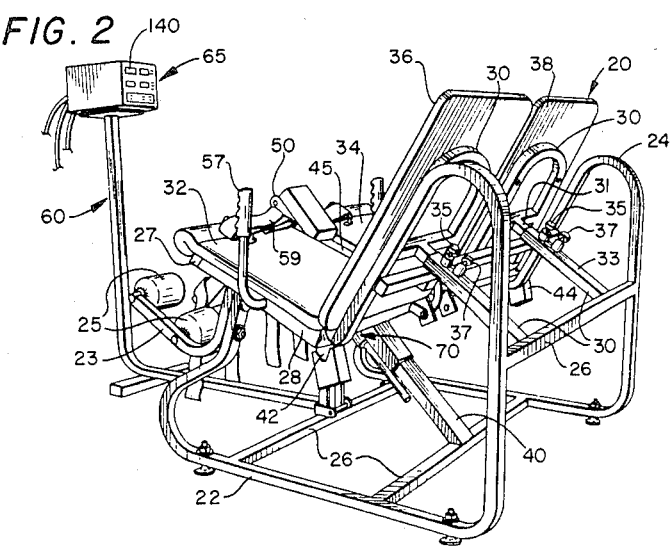
FIG. 2 is a perspective view showing the rear and left side thereof.

A first embodiment of an exercising device, generally designated by the numeral 20, embodying the invention is illustrated in FIGS. 1 and 2 of the drawing. The exercising device 20 comprises generally vertically extending side frame members 22 and 24 connected by laterally extending tie bars 26 and 27. Side frame members 22 and 24 are of substantially identical construction and each is shaped to provide a seat support 28 and a mounting for a back support 30.

As best illustrated in FIG. 1 of the drawing, seats 32 and 34 are slightly inclined, for example, at an angle of 15° from a horizontal plane such that the front edge of the seat is elevated above the rear edge. Seat backs 36 and 38 are mounted adjacent seats 32 and 34, respectively, and each seat back is inclined at an angle of approximately 110° relative to the plane of seats 32 and 34, or approximately 125° relative to a horizontal plane.

From the foregoing, it should be readily apparent that when a user is seated on seat 32 and leaning back against back rest 36, he is in a slightly inclined position. A pair of seat belts 42 and 44 are provided for restraining the user relative to seat 32 and back 36 of the exercising device.

Each seat back 36 and 38 is mounted on a back support 30 having a bar 31 extending rearwardly therefrom and received in a hollow tube 33 welded or otherwise secured to the frame. Each tube 32 has an adjustment screw 35 threadedly secured therein to be selectively positioned in spaced apertures formed through bars 31 for adjusting the position of each seat back 36 and 38 relative to seats 32 and 34. Lock screws 37 are threadedly secured through the wall of tubular members 33 to engage the outer surface of each bar 31 to prevent movement of bar 31 and the associated seat back relative to tubular members 33.

A cylinder support bar 40 has a lower end secured to one of the tie bars 26 adjacent the lower rear portion of the frame and a front end secured to a tie bar 27 which supports the front edge of seats 32 and 34. A console 45 is mounted on the upper end of cylinder support bar 40 and is positioned between seats 32 and 34 to support a valve assembly, as will be hereinafter more fully explained.

Cylinder support bar 40 has spaced ears 46 and 48 extending forwardly of the upper end thereof for rotatably supporting a pivot pin 50. A hollow tubular actuating arm 52 is welded or otherwise secured to a hollow cylindrical bushing 54 which is rotatably supported by pivot pin 50. The length of actuating arm 52 may be adjusted by an adjustment screw 35' and a lock screw 37' in the same manner as hereinbefore described for the adjustment of seat backs 36 and 38.

The lower portion 53 of actuating arm 52 has a rod 54 welded or otherwise secured thereto for rotatably supporting bearing sleeves 55 having pads 56 secured thereto. Pads 56 are adapted to engage the front of the shin of the user and are provided with ankle straps 58 for maintaining the shin of the user in engagement with the pads 56.

Thigh straps 59 are provided to engage the thigh of a user when seated on seat 32 or 34.

Handle bars 57 are provided adjacent opposite sides of each of the seats 32 and 34 to be gripped by the hands of the user to facilitate stabilizing the body of the user.

It should be readily apparent that when a user is seated on seat 32 or 34 his body will be restrained by seat belt 42, ankle strap 58 and thigh strap 59 to stabilize the body of the user. To further stabilize the body, padded cylinders 25 are secured by brackets 23 to side frame members 22 and 24. The leg of the user which is not being exercised is positioned between padded cylinders 25 to prevent movement of the leg which is not being exercised.

As will be hereinafter more fully explained, a computer stand generally designated by numeral 60 is secured in front of the exercising device to support a microprocessor housing 65.

Figure 6:
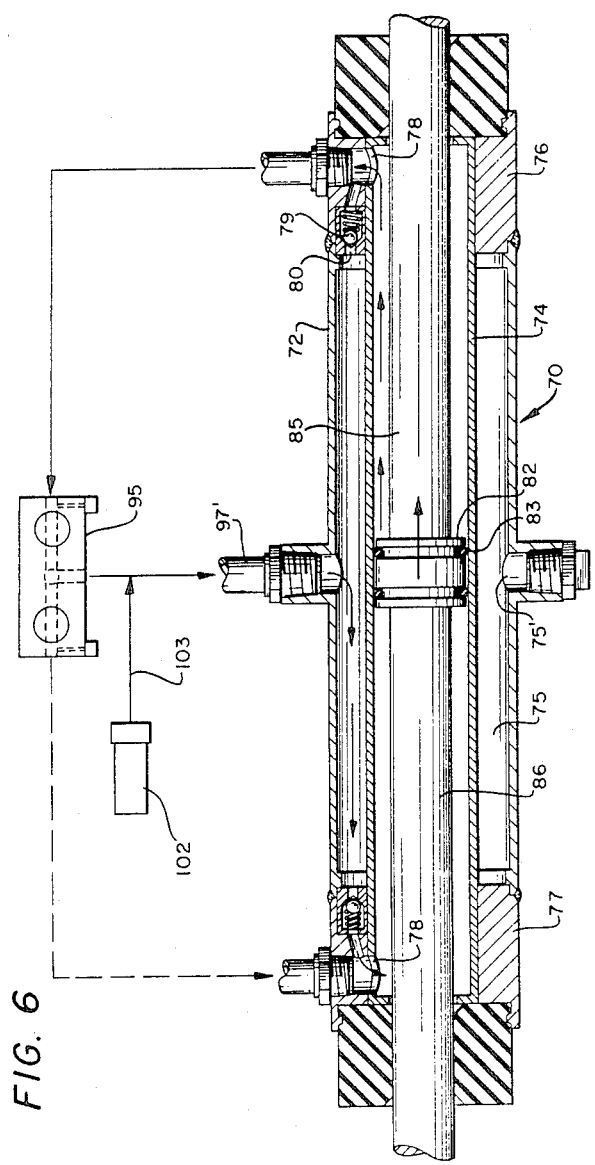
FIG. 6 is an enlarged partially sectionalized view of the hydraulic cylinder.
Figure 7:
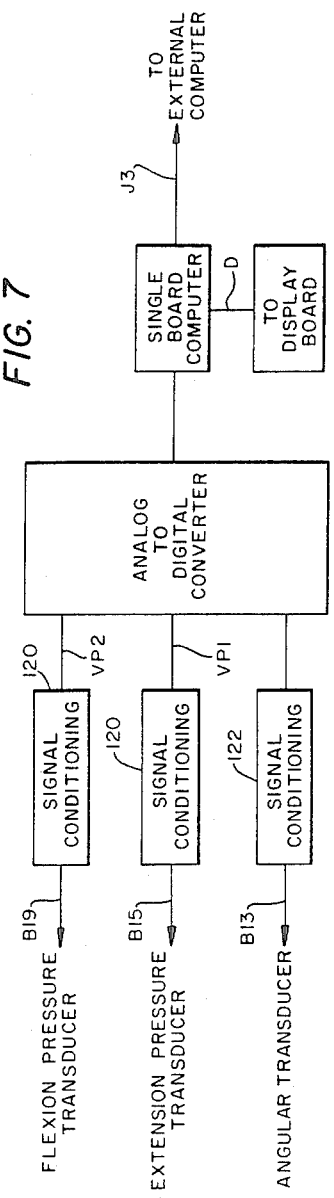
FIG. 7 is a block diagram of the microprocessor circuit.

Movement of actuating arm 52 about pivot pin 50 is resisted by a double acting hydraulic cylinder 70, which as best illustrated in FIG. 6 of the drawing, comprises a cylindrical tubular member 72 having a cylinder housing 74 extending axially therethrough for forming a reservoir 75 in the annulus between cylindrical members 72 and 74. End plugs or cylinder caps 76 and 77 are of identical construction and each is provided with a threaded passage 78 which extends through member 72, 74 and 76 for connecting a hydraulic line in fluid communication with the inside of cylinder 74 as will hereinafter be more fully explained. Plug members 74 are provided with spring loaded check valves 79 in ports 80 which extend between the reservoir in the annulus 75 and passage 78 to permit substantially unrestricted flow of fluid from reservoir 75 into passages 78 but blocking flow of fluid from passage 78 through port 80 into the reservoir 75.

A piston 82 having seal rings 83 mounted thereon is slidably disposed through cylinder 74 and has rods 85 and 86 extending through passages formed in cylinder caps 76 and 77. Thus, when rod 85 is extended, rod 86 is retracted.

Figure 3:
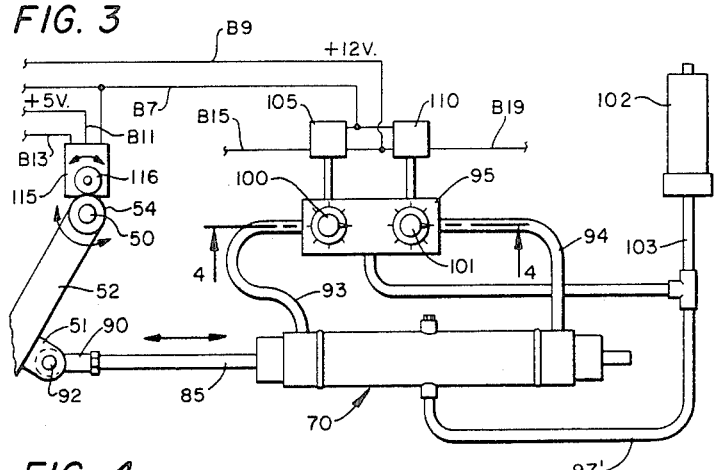
FIG. 3 is a diagrammatic view of the lever arm, hydraulic cylinder and associated valving and sensors for providing input to the microprocessor.

Referring to FIG. 3, rod 85 has a rod eye 90 on the outer end thereof pivotally secured by a pin 92 to lugs 51 on a central portion of actuating arm 52. Cylinder 70 is pivotally secured by pins 71 to cylinder support bar 40. Rod 86 on the opposite end of the cylinder is preferably provided with a stop 86a to limit movement of piston 82 to selectively limit the range of angular movement of arm 52.

As best illustrated in FIG. 3 of the drawing, opposite ends of cylinder 70 are connected through lines 93 and 94 to a control valve 95.

Figure 4:
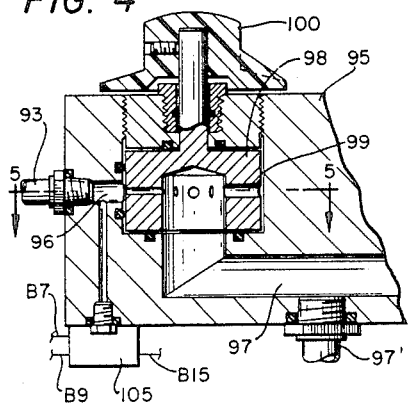
FIG. 4 is a cross sectional view taken along line 4—4 of FIG. 3.
Figure 5:
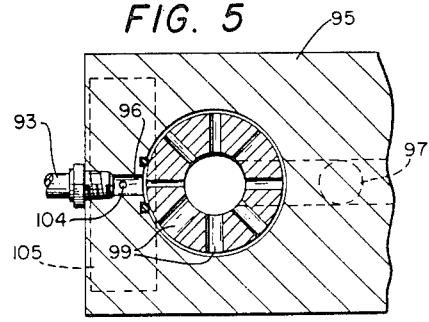
FIG. 5 is a cross sectional view taken along line 5—5 of FIG. 4.

As illustrated in FIG. 4 of the drawing, valve body 95 has a valve element 98 rotatably secured in a chamber communicating with inlet passage 96 and with an outlet passage 97. Valve element 98 has a plurality of metering orifices of varying diameter for placing inlet passage 96 in fluid communication with outlet passage 97. Valve element 98 is rotated to a desired position by rotation of a knob 100 accessible from the console 45 between seats 32 and 34 of exercising device 20. A second knob 101 is positioned for controlling a second valve element to adjust flow through line 94 from the opposite end of double acting hydraulic cylinder 70. As best illustrated in FIG. 5 of the drawing, metering orifices 99 preferably vary in diameter and in the illustrated embodiment, orifices of eight different sizes are provided.

A return line 97' is positioned in communication with return passage 97 in valve body 95 and is connected to a return port communicating with reservoir 75 in cylinder 70. Cylinder 70 is preferably provided with a fill port 75' to facilitate filling the system with hydraulic fluid. An accumulator 102 is connected through a line 103 to return line 97' and is preferably charged to a pressure of approximately 10 pounds per square inch.

Pressure transducers 105 and 110 are connected in fluid communication with the inlet passage 96 in valve body 95 through a passage 104. Pressure transducers 105 and 110 are of conventional design and deliver an output signal related to fluid pressure. As illustrated in FIG. 3 of the drawing, conductor B9 is connected to a 12 volt source and to transducers 105 and 110. Pressure transducers 105 and 110 are connected through a line B7 to ground. The output of pressure transducers 105 and 110 is delivered through conductors B15 and B19, respectively, to a microprocessor. As will be hereinafter more fully explained, signals from conductors B15 and B19 are used to indicate fluid pressure in opposite ends of cylinder 70.

Bearing sleeve 54, secured to the upper end of arm 52 is actuated by a user. A potentiometer 115 having a wheel 116 mounted thereon is positioned such that bearing 54 and wheel 116 are in rolling engagement. Thus, as arm 52 is rotated about pin 50 the output of potentiometer 115 will vary to indicate an angular position of arm 52 relative to the plane of seats 32 and 34. Potentiometer 115 is connected through a conductor B11 to a five volt source and through conductor B7 to ground. The output or wiper of potentiometer 115 is connected through conductor B13 to the microprocessor as will be hereinafter more fully explained.

Figure 9:
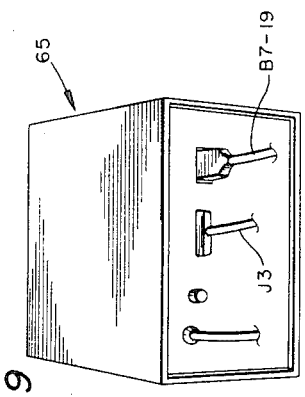
FIG. 9 is a perspective view showing the top and rear of the microprocessor housing.
Figure 10A:
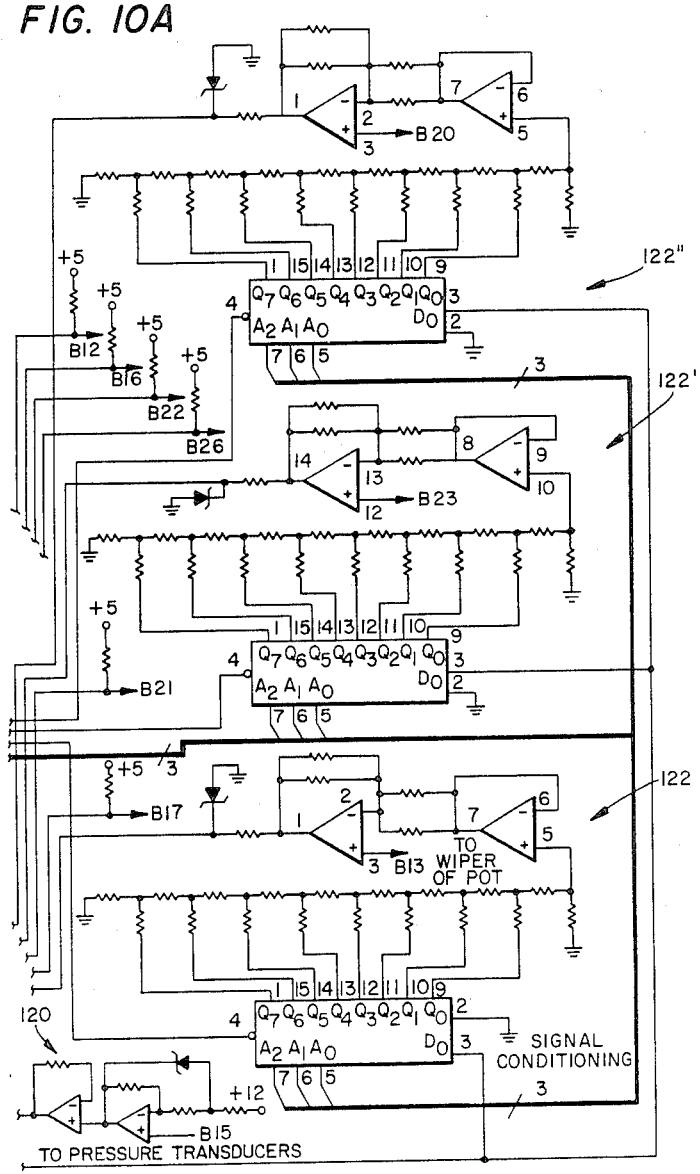
FIGS. 10A, 10B, and 10C are wiring diagrams of the microprocessor circuit.
Figure 10B:
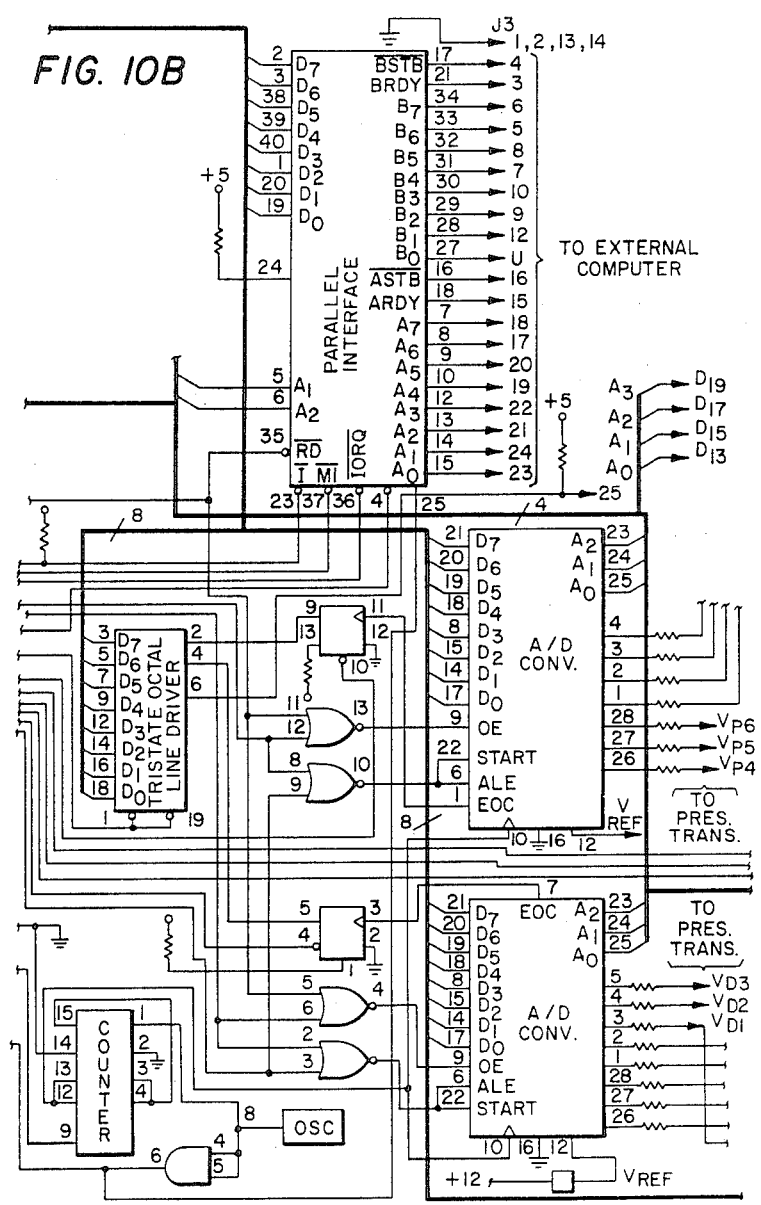
Figure 10C:
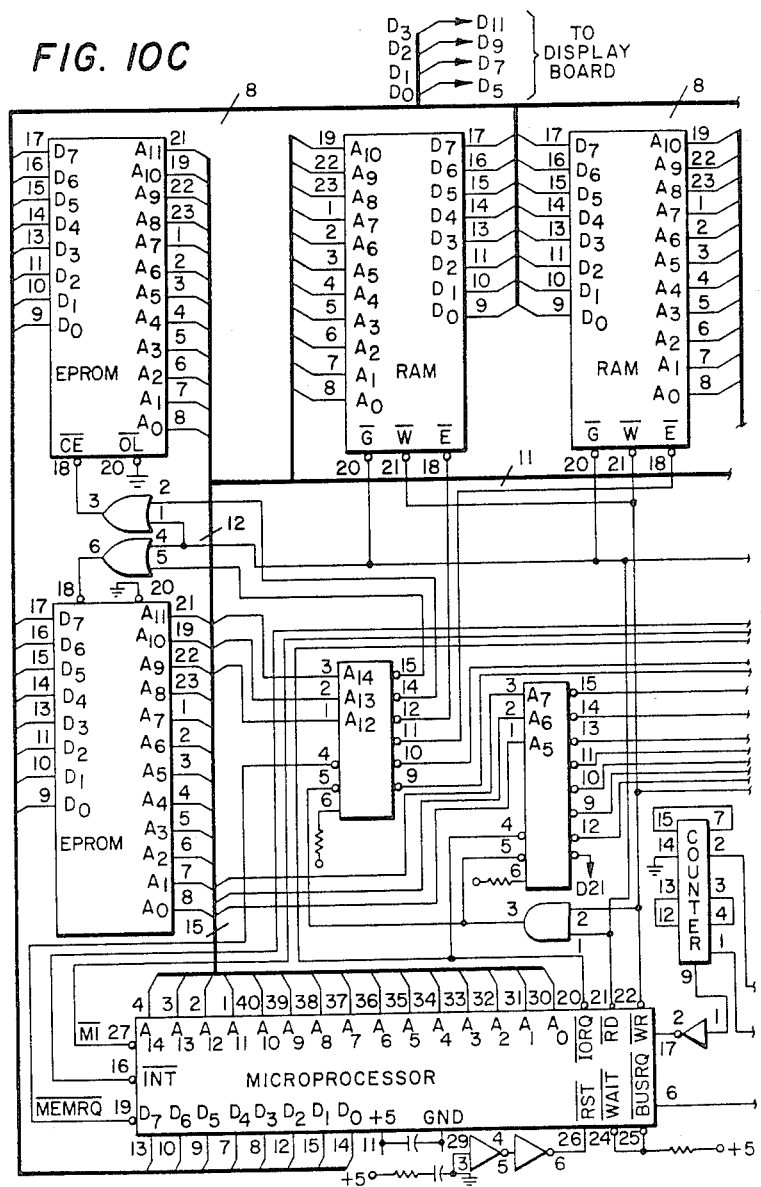

As best illustrated in FIGS. 7-13, signals from pressure transducers 105 and 110 and potentiometer 115 are delivered through a signal conditioning apparatus to a microprocessor to provide an output to a display board in microprocessor housing 65. Signals through conductors B15 and B19 are delivered through signal conditioning circuits 120 to an analog to digital converter designated ADC 0809 in FIG. 10. The signal from potentiometer 115 is delivered through conductor 113 to the analog to digital converter. In FIG. 10 of the drawing, one signal conditioning circuit 120 is diagrammatically illustrated. However, it will be readily apparent that a signal conditioning circuit 120 will be provided for each pressure source which is to be monitored. In FIG. 10 of the drawing, three signal conditioning circuits 122, 122' and 122" are illustrated for accommodating three potentiometers 115 for processing data relating to the angle of more than one arm 52.

Figure 8:
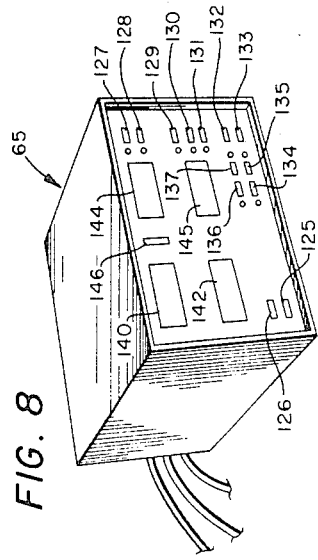
FIG. 8 is a perspective view of the housing for the microprocessor and associated switches to display desired information.
Figure 11A:
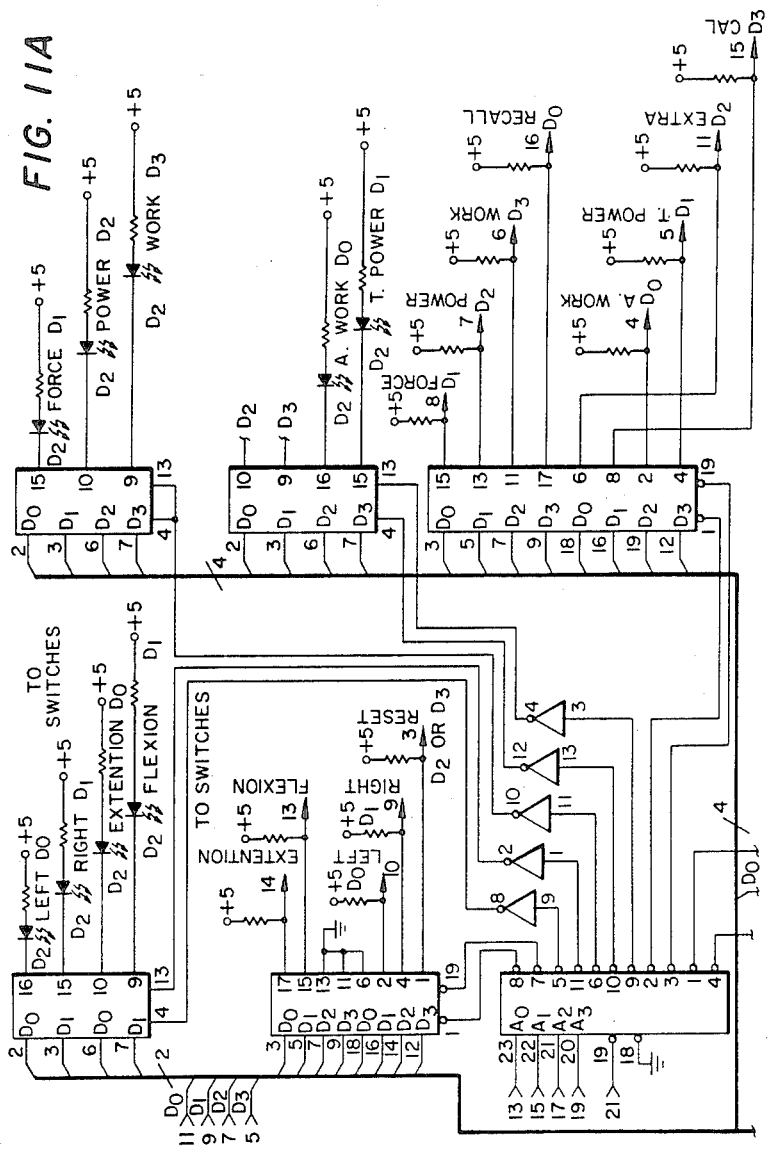

Conductors designated "B" in FIG. 10 of the drawing, are connected to a back plate having a multipin connector and conductors labeled "D" communicate with a display board diagrammatically illustrated in FIG. 11A. Display board is connected through switches to light emitting diodes visible from the front of housing 65. As best illustrated in FIG. 8, the front of housing 65 is provided with an on-off switch 125 and a reset switch 126 on the left side of the housing and a column of switches 127-133 adjacent the right side of the housing along with switches 134-137 on a central portion of the face. Light emitting diodes 140, 142, 144 and 145 display data which is visible to the user and a diode is positioned adjacent each of the switches 125-137 to indicate which switch is in the active position.

Switch 125 is the power switch for turning the system "on and off" and switch 126 is a "reset" switch for resetting a timing cycle. "Elapsed time" is indicated in display 142 and the number of "repetitions", which would be movement of arm 52 from a lower position to an elevated position and back to the lowered position, are indicated by indicator 140.

Switches 127 and 129 would be labeled "work" on the face of the panel. If switch 129 were activated, a number in window 145 would indicate work done during the "previous repetition". When switch 127 is activated, the "accumulated" work since the system was reset will be indicated.

Switches 128 would be labeled "power" and when activated would display power exerted during the "previous repetition" in window 145 and the "accumulated" power in window 144. Switch 132 would be labeled "peak torque" and when switch 131 is activated, a number appearing in window 145 would indicate the maximum torque exerted on arm 52 during the previous repetition.

Switch 132 would be labeled "recall" and when pressed will cause data to be recalled to the system, the number of the particular repetition appearing in window 140 and the peak torque, power or work as selected by switches 129-130 to appear in window 145. Switch 133 is a calibration switch which is employed for initial calibration of the system to establish the angular extremes of a cycle or a single repetition.

Switches 136 and 137 would be labeled "right" and "left", respectively. When a user is seated on seat 34, the strength of his left leg would be indicated. When a user is seated in seat 32, the strength of his right leg would be indicated. A single arm 52 is employed to assure that any error appearing as a result of bearing friction, variation in diameter of cylinders or valve orifices will be eliminated from the system since both the right and left leg will be exercising the same actuating member. Light 145 is illuminated during the timed cycle and is turned on to indicate the beginning of the exercise.

The wiring diagrams of the circuit boards and display boards are illustrated in FIGS. 10-13 of the drawings, and are believed to be self explanatory. As illustrated in FIG. 9 of the drawing, the circuitry is connected through cable B7-19 to pressure transducers 105 and 110 and to angular potentiometer 115 as hereinbefore described. The system is connected through a cable labeled "J3" for inputting the data to a personal computer. Pin connector J3 from parallel interface 8420 is illustrated in FIG. 10B of the drawing.

When the data has been delivered to the personal computer, the data can be permanently stored on tapes or discs for observation at a later date. It will be readily apparent that the data may be illustrated graphically to assist the user or a therapist in determining the strength of each body member at each angle throughout a repetition of an exercise and to compare the data at each angle during each repetition at various times during a training or rehabilitation program. It will be appreciated that cylinder 70 and valve 95 associated therewith permit adjustment of resistance to extension or retraction of rod 85 independently and may be adjusted to provide substantially no resistance to movement in either direction while exerting substantial resistance in the other direction. Thus, the cylinder 70 can be made as a single acting cylinder upon movement of the piston in either direction or as a double acting cylinder by merely rotating knobs 100 and 101 on valve housing 95.

DESCRIPTION OF A SECOND EMBODIMENT

A second embodiment of the exercising device, generally designated by the numeral 220, is illustrated in FIGS. 14-23 of the drawing. The second embodiment of the exercising device 220 comprises generally vertically extending side frame members 222 and 224 connected by laterally extending tie rods.

The second embodiment of the apparatus is designed for several different double-positive exercise movements.

The exercise known as the chest press/row provides movements referred to as shoulder flexion and extension, scapular adduction and abduction, and elbow extension and flection. While the body is supported on seat 332 and back 236, the user grips handles 357, bends the elbow for pulling the handles toward his chest and then pushes the handles away from his chest until the arms are fully extended.

The shoulder press/lateral pull is accomplished using the overhead handle bars 457 which extend above the head 457 of the user on each side. When the user pushes bars upward he is performing the shoulder press movement. When the user brings the bars back down, he is performing the lateral pull exercise.

When the user places a leg in engagement with ankle pad 256, the user starts with his knees flexed, extends the leg until it is completely straight and pointed away from seat 232. With no pause, the user immediately bends his knee to bring his leg back to the starting position. When the user straightens the leg, the exercise is referred to as the knee extension. When the user bends his knee and brings his foot back under seat 232, he is performing the knee flexion movement.

Figure 16:
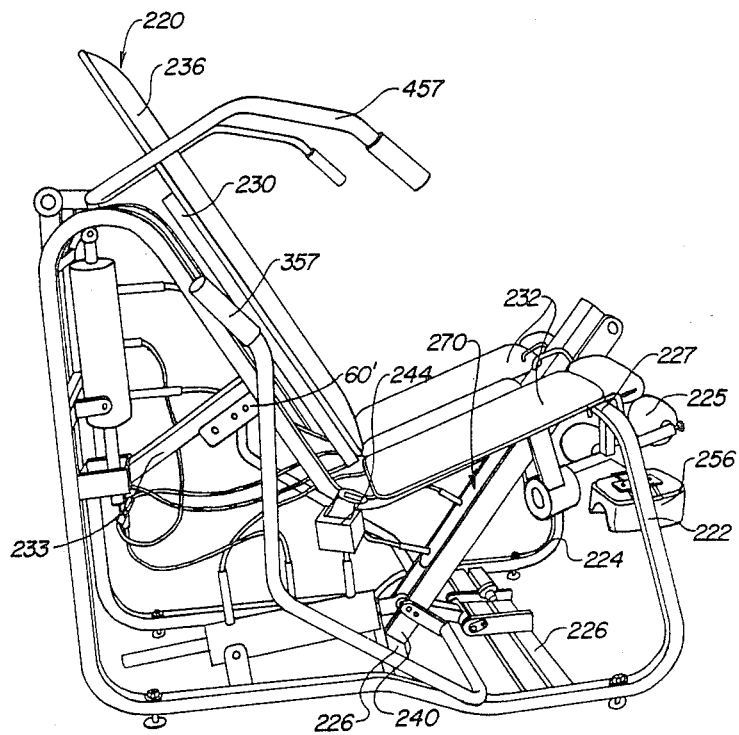
FIG. 16 is a perspective view showing the right side of the second embodiment.

As best illustrated in FIG. 16 of the drawing, a single seat 232 is slightly inclined, for example, at an angle of 15° from a horizontal plane such that the front edge of the seat is elevated above the rear edge. Single seat back 236 is mounted adjacent seat 232 and is inclined at an angle of approximately 110° relative to the plane of seat 232, or approximately 125° relative to a horizontal plane.

From the foregoing, it should be readily apparent that when a user is seated on seat 232 and leaning back against back rest 236, he is in a slightly inclined position. A pair of seat belts 242 and 244 are provided for restraining the user relative to seat 232 and back 236 of the exercising device.

Seat back 236 is mounted on a back support having a bar 231 extending rearwardly therefrom and received in a hollow tube 233 welded or otherwise secured to the frame.

A cylinder support bar 240 has a lower end secured to one of the tie bars 226 adjacent the lower rear portion of the frame and a front end secured to a tie bar 227 which supports the front edge of seat 232.

Figure 17:
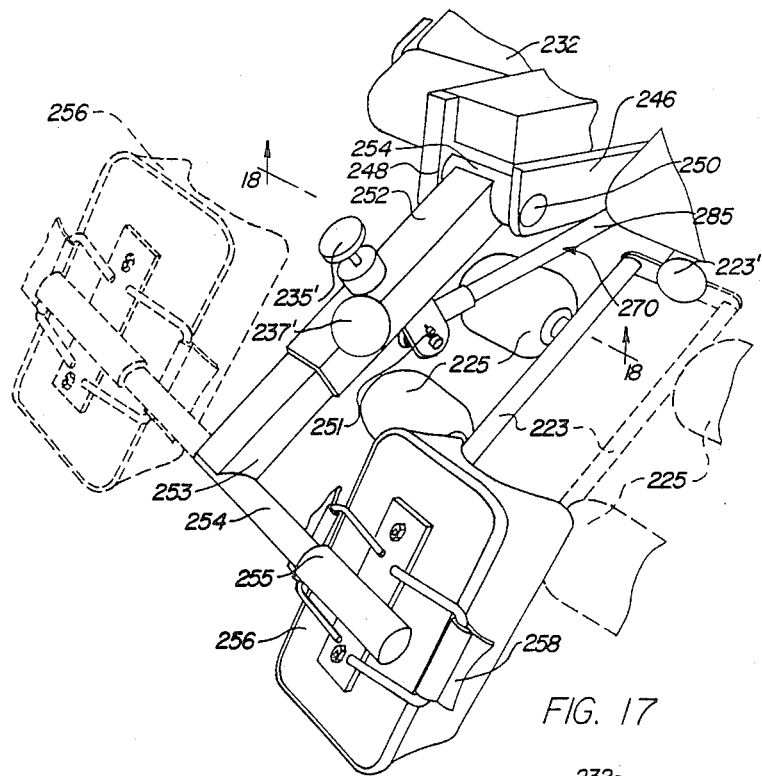
FIG. 17 is an enlarged fragmentary perspective view of the leg exercising and leg support arms of the second embodiment.

As illustrated in FIG. 17, cylinder support bar 240 has spaced ears 246 and 248 extending forwardly of the upper end thereof for rotatably supporting a pivot pin 250. A hollow tubular actuating arm 252 is welded or otherwise secured to a hollow cylindrical bushing 254 which is rotatably supported by pivot pin 250. The length of actuating arm 252 may be adjusted by an adjustment screw 235' and a lock screw 237' in the same manner as hereinbefore described for the adjustment of seat back 236.

The lower portion 253 of actuating arm 252 has a rod 254 welded or otherwise secured thereto for rotatably supporting a bearing sleeve 255 having a pad 256 secured thereto. Pad 256 is adapted to engage the front of the shin of the user and is provided with ankle straps for maintaining the shin of the user in engagement with the pad 256.

Handle bars 357 are provided adjacent opposite sides of each seat 232 to be gripped by the hands of the user to facilitate stabilizing the body of the user when selector valve 470 is positioned to prevent movement of the handle bars 357 as will be hereinafter explained. It should be readily apparent that when a user is seated on seat 232 his body will be restrained by seat belt 242 and ankle strap 258 to stabilize the body of the user. To further stabilize the body, padded cylinders 225 are secured by bracket 223 to a swivel 223', as will be hereinafter more fully explained. The leg of the user which is not being exercise is positioned between padded cylinders 225 to prevent movement of the leg which is not being exercised.

Referring specifically to FIG. 17 of the drawing, it will be appreciated that pad 256 may be moved from the position illustrated in full outline to the position illustrated in dashed outline by loosening blocking pins 235' and 237' permitting telescopic movement of arm 253 relative to tube 252 for removal of arm 253 to permit rotation of the member through an angle of 90°.

Padded rollers 225 are mounted on a bar 223 supported by a pivot swivel 223'. A spring loaded pin (not shown) on swivel 223' enters into spaced recesses to permit rotation of arm 223 from the position shown in full outline to the position shown in dashed outline. Thus, if the left leg of the user is to be exercised and tested, the left leg is positioned in engagement with pad 256 and the right leg is stabilized between pads 225 as illustrated in full outline. However, if the right leg is to be exercised, pad 256 is moved to the position illustrated in dashed outline and rollers 225 are moved to the position illustrated in dashed outline in FIG. 17 of the drawing. The left leg of the user is then stablized by rollers 225 while the right leg is positioned in engagement with pad 256.

Figure 18:
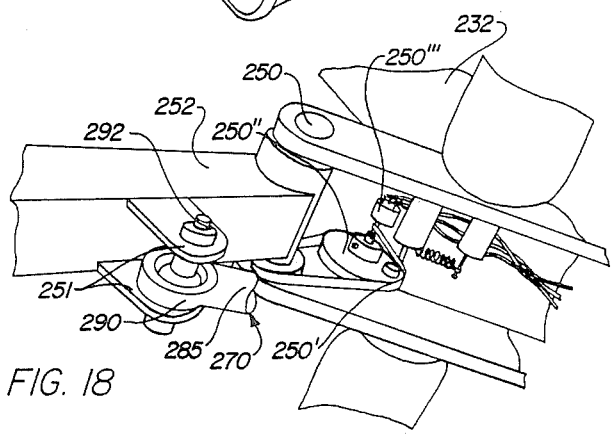
FIG. 18 is a cross-sectional view taken along line 18—18 of FIG. 17.

The potentiometer circuit illustrated in FIG. 18 of the drawing is substantially the same as that hereinbefore described and illustrated in FIG. 3 of the drawing. Rotation of pin 250 imparts rotation to a pulley and a timing belt 250' for rotation of a pulley 250'' for rotation of potentiometer 250'''.

Figure 14:
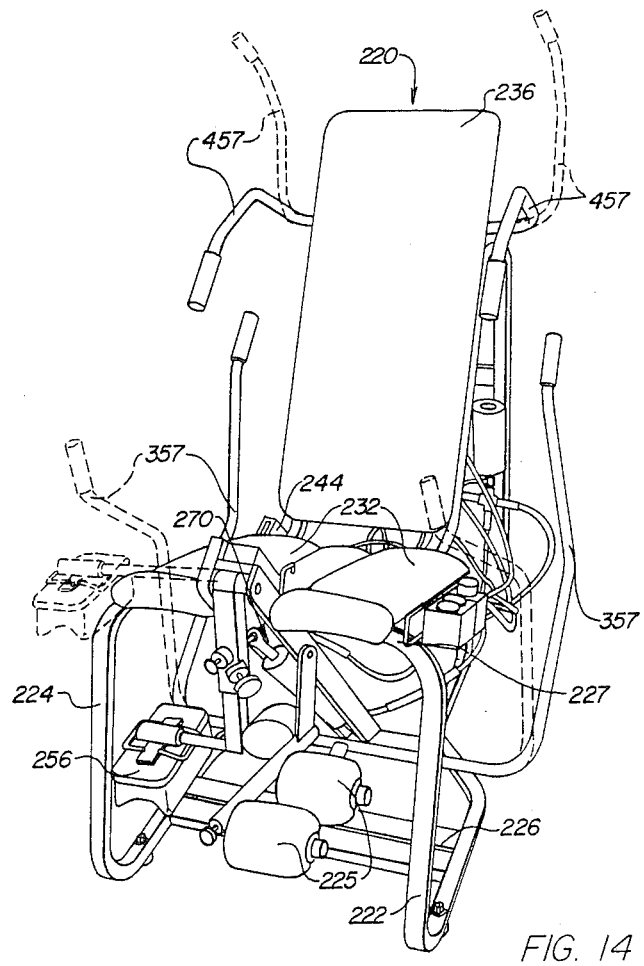
FIG. 14 is a perspective view showing the front and left side of a second embodiment of the exercising device.
Figure 15:
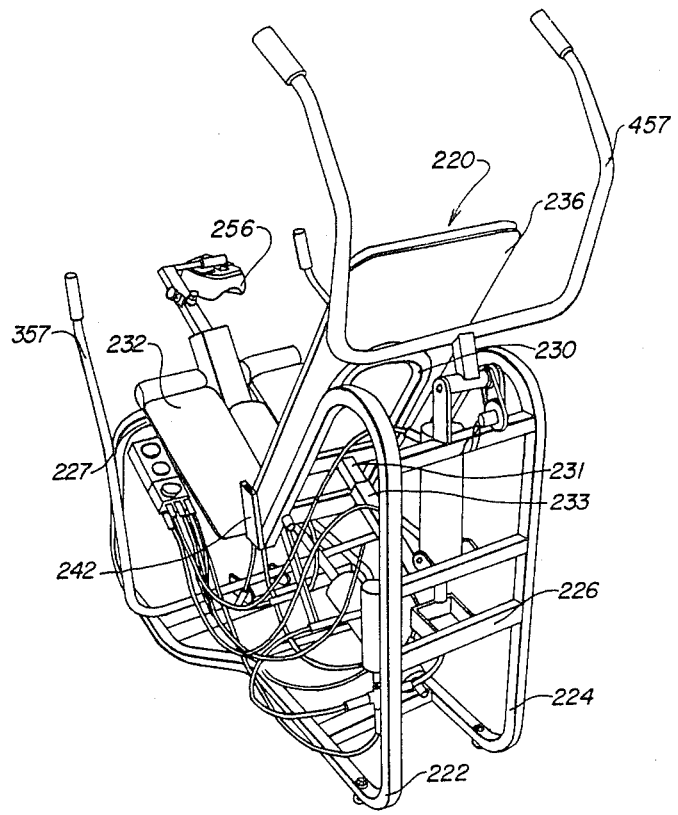
FIG. 15 is a perspective view showing the rear and left side of the second embodiment.

As best illustrated in FIGS. 14 and 16, handle bars 357 are pivotally secured by a pin 350 and movement thereof is resisted by a double acting hydraulic cylinder 370. Pin 350 drives a potentiometer in the same manner as hereinbefore described.

The overhead handle bars 457 are pivotally secured by a pin 450 to the frame and movement thereof is resisted by a double acting hydraulic cylinder 470. Pin 450 drives a potentiometer as hereinbefore described.

The control valve 95 of the first embodiment has been replaced by a selector valve in series with a control valve for connecting opposite ends of a single cylinder 270, 370 or 470 through the control valve orifices to generate signals related to the pressure of fluid as will be hereinafter more fully explained.

Lines 400 and 401 communicating with opposite ends of cylinder 270 communicate with selector valve 465 having a valve spool 470 mounted therein for selectively connecting lines 400 and 401 or lines 400a and 401a or lines 400b and 401b to a passage 402 communicating with orifice plug 298 which is substantially the same as the valve element designated by numeral 98 in FIG. 4 of the drawing except that valve element 298 has 11 openings of varying sizes and a twelfth position which does not have an opening for blocking flow of hydraulic fluid. Fluid flowing through the selected orifice in valve member 198 flows to a return line 497 which is connected through a tee 497' to a manifold 498 which communicates with return lines to cylinders 370 and 470.

Fluid flowing through line 401b flows through passage 403 and is metered through a valve 298' into the return line 497. When valve element 470 is in the position illustrated in FIGS. 20 and 21, flow through lines 400 and 401 and through lines 400b and 401b are blocked. Thus, it should be readily apparent that pressure transducers 105 and 110 will generate a signal related to the pressure exerted on the selected cylinder.

A computer stand (not shown) of the type generally designated by numeral 60 in FIG. 1 is secured to bracket 60 on the exercising device to support a microprocessor housing 65.

Movement of actuating arm 252 about pivot pin 250 is resisted by a double acting hydraulic cylinder 270, which is the same as cylinder 70 hereinbefore described and illustrated in FIG. 6 of the drawing, comprises a cylindrical tubular member 72 having a cylinder housing 74 extending axially therethrough for forming a reservoir 75 in the annulus between cylindrical members 72 and 74.

Referring to FIG. 19, rod 285 has a rod eye 290 on the outer end thereof pivotally secured by a pin 292 to lugs 251 on a central portion of actuating arm 252. Cylinder 270 is pivotally secured by pins 271 to cylinder support bar 240. Rod 286 on the opposite and of the cylinder is preferably provided with a stop 286a to limit movement of piston 82 to selectively limit the range of angular movement of arm 252.

As best illustrated in FIG. 19 of the drawing, opposite ends of cylinder 70 are connected through lines 400 and 401 and through selector valve 395 to a control valve 295.

As illustrated in FIGS. 19–23 of the drawing, valve body 295 has a valve element 298 rotatably secured in a chamber communicating with inlet passage 496 and with an outlet passage 497. Valve element 498 has a plurality of metering orifices of varying diameter for placing inlet passage 496 in fluid communication with outlet passage 497. Valve element 498 is rotated to a desired position by rotation of a knob 100 adjacent seat 232 of exercising device 220. A second knob 101 is positioned for controlling a second valve element to adjust flow through line 401 from the opposite end of double acting hydraulic cylinder 270. Metering orifices 299 preferably vary in diameter and in the illustrated embodiment, orifices of eight different sizes are provided.

Having described the invention, what is claimed is:

1. An exercising device comprising: a frame for supporting a human body, a seat support member on said frame; a back support member on said frame; actuating means pivotally secured to said support frame for engaging one leg of a user, said actuating means extending between the knees of the user; actuated means secured to said actuating means resisting movement of said actuating means from a position wherein the leg of the user is beneath the knee of the user and a position wherein the leg of the user is extended; first leg engaging means secured to said actuating means to engage a first leg of the user; second leg engaging means secured to said frame for stabilizing a leg of the user; and means securing said actuating means to said frame to permit movement of said first leg engaging means to a position to engage the second leg of the user when the first leg of the user is stabilized by said second leg engaging means.

2. An exercising device according to claim 1 said actuated means comprising double acting fluid pressure actuated means; a piston in said actuated means forming first and second chambers on opposite sides of said piston, said actuated means having a plurality of outlet openings, one of said outlet openings communicating with said first chamber and another of said outlet openings communicating with said second chamber; reservoir means communicating with said first and second chambers; first valve means arranged to meter flow of fluid from said first chamber to said reservoir; and second valve means arranged to meter flow of fluid from said second chamber to said reservoir.

* * * * *